(12) United States Patent
Feng

(10) Patent No.: US 8,713,230 B2
(45) Date of Patent: Apr. 29, 2014

(54) METHOD FOR ADJUSTING LINK SPEED AND COMPUTER SYSTEM USING THE SAME

(75) Inventor: Kang-Ning Feng, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 248 days.

(21) Appl. No.: 13/212,194

(22) Filed: Aug. 18, 2011

(65) Prior Publication Data

US 2012/0047308 A1 Feb. 23, 2012

(30) Foreign Application Priority Data

Aug. 18, 2010 (TW) .............................. 99127599 A

(51) Int. Cl.
*G06F 13/00* (2006.01)
(52) U.S. Cl.
USPC .......................................................... 710/104
(58) Field of Classification Search
USPC ................................................. 710/306, 104
See application file for complete search history.

(56) References Cited

U.S. PATENT DOCUMENTS

| 5,911,055 | A | * | 6/1999 | Whiteman et al. ............ 710/305 |
| 6,442,628 | B1 | * | 8/2002 | Bastiani et al. ................. 710/60 |
| 7,068,609 | B2 |   | 6/2006 | Huff |
| 7,536,490 | B2 | * | 5/2009 | Mao .............................. 710/104 |
| 2003/0023841 | A1 | * | 1/2003 | Atherton et al. .................. 713/1 |
| 2006/0047879 | A1 | * | 3/2006 | Hack et al. ..................... 710/302 |
| 2007/0008898 | A1 | * | 1/2007 | Sharma et al. ................ 370/252 |
| 2009/0180382 | A1 | * | 7/2009 | Klein et al. .................... 370/235 |
| 2011/0040916 | A1 | * | 2/2011 | Atherton ....................... 710/300 |

* cited by examiner

*Primary Examiner* — Nimesh G Patel
(74) *Attorney, Agent, or Firm* — Winston Hsu; Scott Margo

(57) ABSTRACT

A method for adjusting a link speed and a computer system using the same are provided. The method is used after executing a boot block code and before executing a bus enumeration procedure. A testing step is executed using a maximum link speed supported by both a bridge and a peripheral device. If the test fails, the link speed is adjusted down until the test succeeds, thus automatically adjusting the link speed of the bridge.

10 Claims, 5 Drawing Sheets

|  | PCIe bridge 111 | PCIe bridge 121 | PCIe bridge 131 |
| --- | --- | --- | --- |
| primary bus number | 0 | 1 | 1 |
| secondary bus number | 1 | 2 | 3 |
| subordinate bus number | 3 | 2 | 3 |

FIG. 1B (Prior Art)

METHOD FOR ADJUSTING LINK SPEED AND COMPUTER SYSTEM USING THE SAME

CROSS-REFERENCE TO RELATED APPLICATIONS

This Non-provisional application claims priority under 35 U.S.C. §119(a) on Patent Application No(s). 099127599 filed in Taiwan, Republic of China on Aug. 18, 2010, the entire contents of which are hereby incorporated by reference.

BACKGROUND OF THE INVENTION

1. Field of the Invention

This disclosure relates to a method of adjusting a link speed of a bridge and, more particularly, to a method for automatically adjusting a link speed of a bridge before executing a bus enumeration procedure and a computer system using the same.

2. Description of the Related Art

A built-in peripheral component interconnect express (PCI Express) bridge of a chipset on a motherboard is usually used for connecting an add on card. At present, communication and physical connection between a controller on the add on card and the chipset depend on hardware logic circuits in the chipset.

Generally, a bridge is searched by reading its register. For the PCIe bridge, it provides three registers to indicate buses connected thereto. The three registers are used for storing a primary bus number, a secondary bus number, and a subordinate bus number, respectively. The buses connected with the PCIe bridge can be found via the three numbers. The primary bus number indicates the number of the upstream bus immediately connected with the PCIe bridge. The secondary bus number indicates the number of the downstream bus immediately connected with the PCIe bridge. The subordinate bus number indicates the maximum number among all the downstream bus numbers of the PCIe bridge.

FIG. 1A is a schematic diagram showing a PCIe structure. FIG. 1B is a schematic diagram showing bus numbers. Please refer to FIG. 1A and FIG. 1B. A primary bridge 100 is connected with a PCIe bridge 111 via a bus 0, and the PCIe bridge 111 is connected with a PCIe bridge 121 and a PCIe bridge 131 via a bus 1. The PCIe bridge 121 and the PCIe bridge 131 are connected with a PCIe device 140 and a PCIe device 150 via a bus 2 and a bus 3, respectively.

The primary bus number of the PCIe bridge 111 is 0. Since the secondary bus number is the number of the downstream bus immediately connected thereto, here the secondary bus number is 1. The subordinate bus number is 3. Similarly, for the PCIe bridge 121, the primary bus number is 1. The secondary bus number is the number of the downstream bus immediately connected thereto and therefore it is 2. The subordinate bus number is 2. For the PCIe bridge 131, the primary bus number is 1. The secondary bus number is the number of the downstream bus immediately connected thereto and therefore it is 3. The subordinate bus number is 3. Accordingly, the bus information of the corresponding PCIe bridge can be obtained via reading the aforementioned bus numbers. Further, whether the bridge is connected with a certain peripheral device can be determined via the bus information.

At present, the implementation of a PCI Express interface includes different versions such as PCI Express 1.0, PCI Express 2.0, PCI Express 3.0 and so on. These versions define different speed and related communication protocols, respectively, and therefore incompatibility of the link speed may occur due to different versions when a connection is established between the PCI Express bridge and the controller on the add on card. If a valid connection between the add on card and the PCI Express bridge of the chipset fails to be established, the system may fail to recognize and use the add on card and a peripheral controller on the motherboard, and more seriously, the system may be unstable.

Conventionally, a basic input/output system (BIOS) for initialization provides two connecting modes. One is directly using hardware in the chipset for connection. However, if the connection fails, only a message indicating a connection error occurs is provided. The add on card work normally fails to be determined until an operating system is loaded. If the add on card fails to work normally, the system has to be rebooted and the link speed has to be forcedly adjusted down via options of the BIOS. The other is forcedly adjusting the link speed to the slowest speed. However, it is also inconvenient.

BRIEF SUMMARY OF THE INVENTION

This disclosure provides a method for adjusting a link speed, being capable of automatically selecting a best link speed between a bridge and a peripheral device.

The disclosure provides a computer system ensuring that a peripheral device connected with a bridge can be found when a bus enumeration procedure is executed.

The embodiment of the invention provides a method for adjusting a link speed used after executing a boot block code and before executing a bus enumeration procedure. The embodiment of the method includes the following steps. At first, a bus information list is read to select a target bridge. If the target bridge is connected with a peripheral device, a maximum link speed supported by both the target bridge and the peripheral device is taken as the link speed between the target bridge and the peripheral device. Then whether the target bridge is capable of accessing the peripheral device is tested. If the target bridge fails to access the peripheral device, the link speed is adjusted down and a connection between the target bridge and the peripheral device is re-established. Afterwards the steps of testing whether the target bridge is capable of accessing the peripheral device and adjusting the link speed down if the target bridge fails to access the peripheral device are re-executed until the target bridge is capable of accessing the peripheral device.

In one embodiment, after the step of reading the bus information list to select the target bridge, the method may further include the following steps. A temporary bus number may be allocated to the target bridge. Whether a bus of the target bridge is connected with the peripheral device may be determined according to the temporary bus number.

In one embodiment, the step of allocating the temporary bus number to the target bridge may include the step of writing a subordinate bus number and a secondary bus number into respective registers. Further, after the step of testing whether the target bridge is capable of accessing the peripheral device, if the target bridge is capable of accessing the peripheral device, the registers for storing the subordinate bus number and the secondary bus number may be restored.

In one embodiment, the method may further include the following steps. Whether the target bridge is the last one whose link speed is to be adjusted in the bus information list may be determined. If the target bridge is not the last one whose link speed is to be adjusted in the bus information list, the bus information list may be read to select another target bridge.

The embodiment of the invention provides a computer system including a central processing unit (CPU), a control chip, and a basic input/output system (BIOS) unit. The CPU executes a boot block code. The control chip is coupled to the CPU, and the BIOS unit is coupled to the control chip. After the CPU executes the boot block code and before the BIOS unit executes a bus enumeration procedure, the BIOS unit executes the following steps. The BIOS unit reads a bus information list to select a target bridge. If the target bridge is connected with a peripheral device, the BIOS unit takes a maximum link speed supported by both the target bridge and the peripheral device as the link speed between the target bridge and the peripheral device. Afterwards the BIOS unit tests whether the target bridge is capable of accessing the peripheral device. If the target bridge fails to access the peripheral device, the BIOS unit adjusts the link speed down, and after a connection between the target bridge and the peripheral device is re-established, the BIOS unit re-executes the steps of testing whether the target bridge is capable of accessing the peripheral device and adjusting the link speed down if the target bridge fails to access the peripheral device until the target bridge is capable of accessing the peripheral device.

To sum up, the invention automatically adjusts the link speed via the BIOS unit before the bus enumeration procedure is executed, ensuring that the peripheral device connected with the bridge can be found when the bus enumeration procedure is executed. Further, the late allocation of system resource when the computer is booted may not be affected and effect on the booting procedure may be reduced.

These and other features, aspects, and advantages of the present invention will become better understood with regard to the following description, appended claims, and accompanying drawings.

BRIEF DESCRIPTION OF THE DRAWINGS

FIG. 1B is a schematic diagram showing bus numbers;

DETAILED DESCRIPTION OF THE INVENTION

Generally, whether an add on card is connected with a bridge of a chipset properly may affect the system. Therefore, the invention provides a method for adjusting a link speed and a computer system using the same. The link speed of the bridge is adjusted when the computer system is booted, thus ensuring compatibility between the computer system and a peripheral device such as an add on card.

Figure 1A:
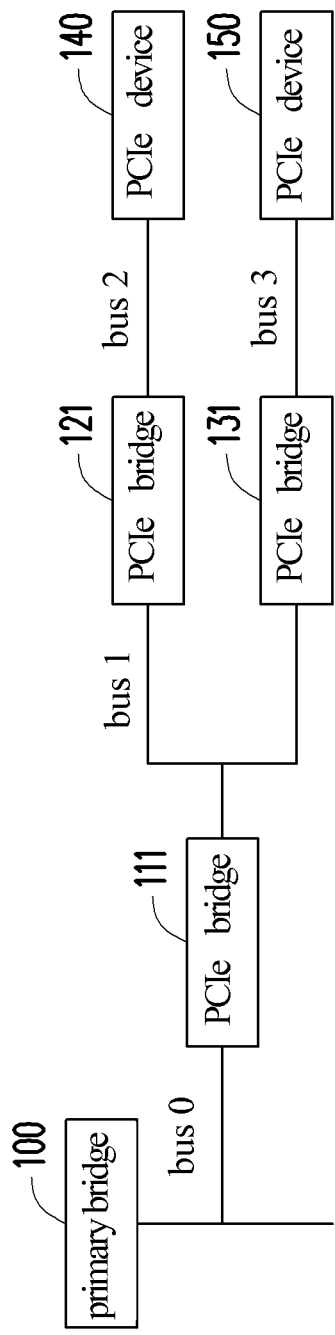
FIG. 1A is a schematic diagram showing a PCIe structure.
Figure 2:
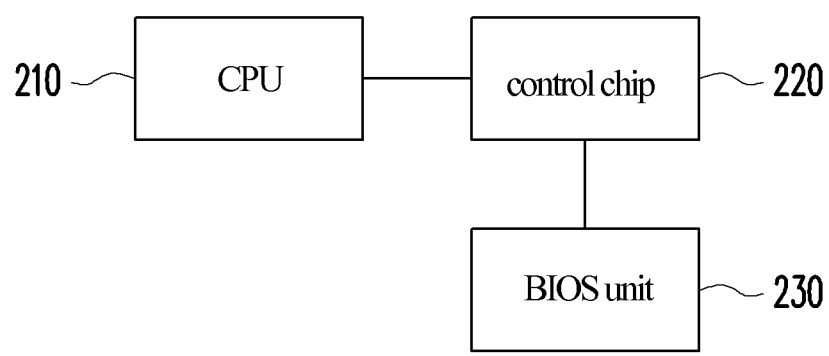
FIG. 2 is a block diagram showing a computer system according to one embodiment of the invention.

FIG. 2 is a block diagram showing a computer system according to one embodiment of the invention. Please refer to FIG. 2. In this embodiment, the computer system at least includes a CPU 210, a control chip 220, and a BIOS unit 230.

The control chip 220 may be a south bridge chip, a north bridge chip, or a chipset integrating the south bridge chip and the north bridge chip. The BIOS unit 230 may be a read only memory (ROM) or a flash memory for storing basic codes for loading the system, i.e. a BIOS.

In the embodiment, an algorithm is added into codes of the BIOS unit 230, thus adjusting a link speed of a bridge via the BIOS unit 230. The steps of adjusting the link speed of the bridge are executed after the CPU 210 executes a boot block code and before the BIOS unit 230 executes a bus enumeration procedure.

In detail, the BIOS unit 230 at least executes the following steps. The BIOS unit 230 reads a bus information list to select a target bridge. If the target bridge is connected with a peripheral device, the BIOS unit 230 takes a maximum link speed supported by both the target bridge and the peripheral device as the link speed between the target bridge and the peripheral device. Further, after the target bridge is connected with the peripheral device, the BIOS unit 230 tests whether the target bridge is capable of accessing the peripheral device. If the target bridge fails to access the peripheral device, the link speed is adjusted to a lower grade, and after a connection between the target bridge and the peripheral device is re-established, the BIOS unit 230 re-executes the steps of testing whether the target bridge is capable of accessing the peripheral device and adjusting the link speed down if the target bridge fails to access the peripheral device until the target bridge is capable of accessing the peripheral device. Thus peripheral devices connected with each bridge can be found when the bus enumeration procedure is executed, and further the peripheral devices can be accessed.

Each step of adjusting the link speed of the bridge may be explained via the following flow chart.

Figure 3:
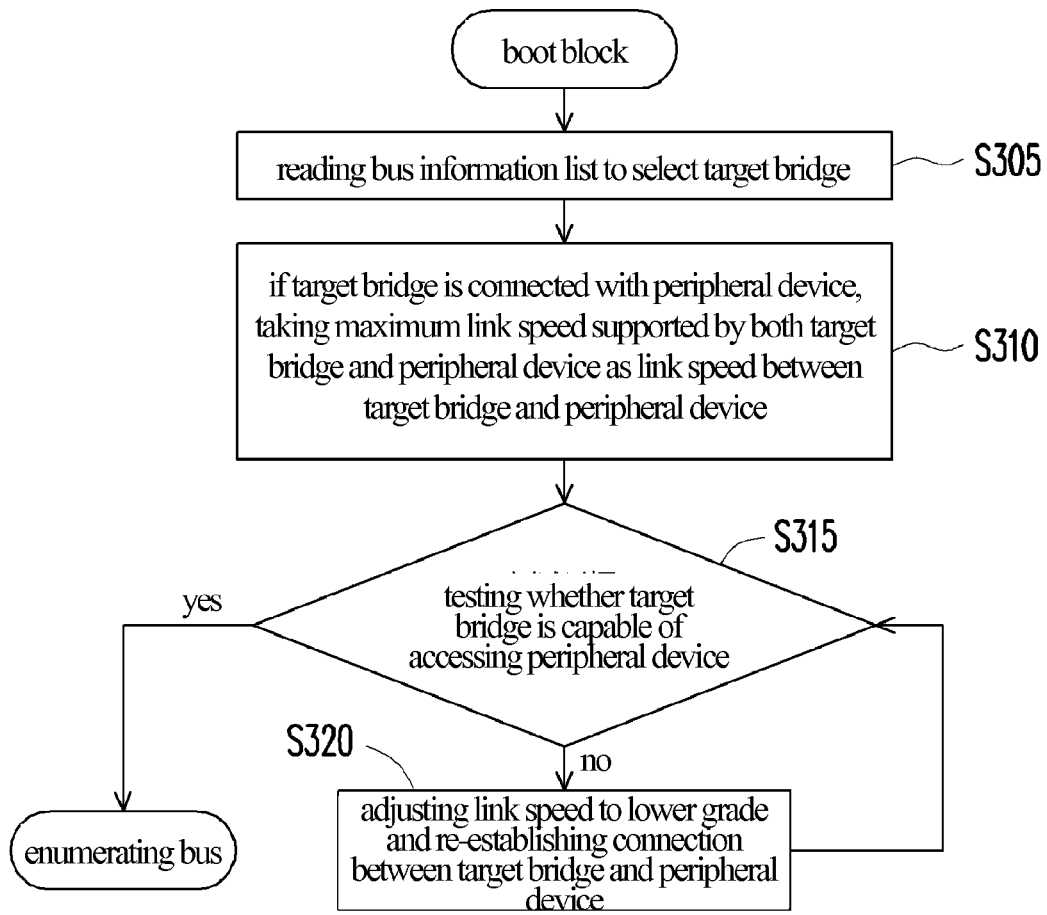
FIG. 3 is a flow chart showing a method for adjusting a link speed of a bridge according to one embodiment of the invention.

FIG. 3 is a flow chart showing a method for adjusting a link speed of a bridge according to one embodiment of the invention. Please refer to FIG. 3. After the CPU executes the boot block code, step S305 is executed to read a bus information list to select a target bridge.

For example, the bus information list can be created according to circuits on a motherboard. The related information about all the bridges on the motherboard can be created in the bus information list. The bus information list records one or a combination of a device ID, a vendor ID, a bus number, a device number, and a function number of each bridge whose link speed is to be adjusted.

Then in step S310, if the target bridge is connected with a peripheral device, a maximum link speed supported by both the target bridge and the peripheral device is taken as the link speed between the target bridge and the peripheral device. After the link speed is determined, a connection between the target bridge and the peripheral device can be established.

In step S315, whether the target bridge is capable of accessing the peripheral device is tested. For example, data exchange therebetween may be tested. In step S320, if the target bridge fails to access the peripheral device, the link speed is adjusted to a lower grade, and after a connection between the target bridge and the peripheral device is re-established, step S315 is re-executed to test whether the target bridge is capable of accessing the peripheral device until the target bridge is capable of accessing the peripheral device.

For example, for a peripheral component interconnect express (PCI Express, hereinafter: PCIe) interface, it includes different versions such as PCI Express 1.0, PCI Express 2.0, PCI Express 3.0 and so on. The PCIe 1.0 provides a link speed of 2.5 GT/second (gigatransfer per second); the PCIe 2.0 provides a link speed of 5.0 GT/second; the PCIe 3.0 provides a link speed of 8.0 GT/second.

If the target bridge supports the PCIe 3.0 (providing the link speed of 8.0 GT/second) and is compatible with the PCIe 2.0 (providing the link speed of 5.0 GT/second) and the PCIe 1.0 (providing the link speed of 2.5 GT/second), and if the peripheral device supports the PCIe 2.0 (providing the link speed of 5.0 GT/second) and is compatible with the PCIe 1.0 (providing the link speed of 2.5 GT/second), the link speed can be defined as a maximum link speed supported by both sides, i.e. 5.0 GT/second. After a connection is established, if the target bridge fails to access the peripheral device, the link speed is adjusted to a lower grade, i.e. the slowest speed 2.5 GT/second.

After the link speed of the bridge is adjusted, the BIOS executes other initialization procedures including the bus enumeration procedure.

Figure 4:
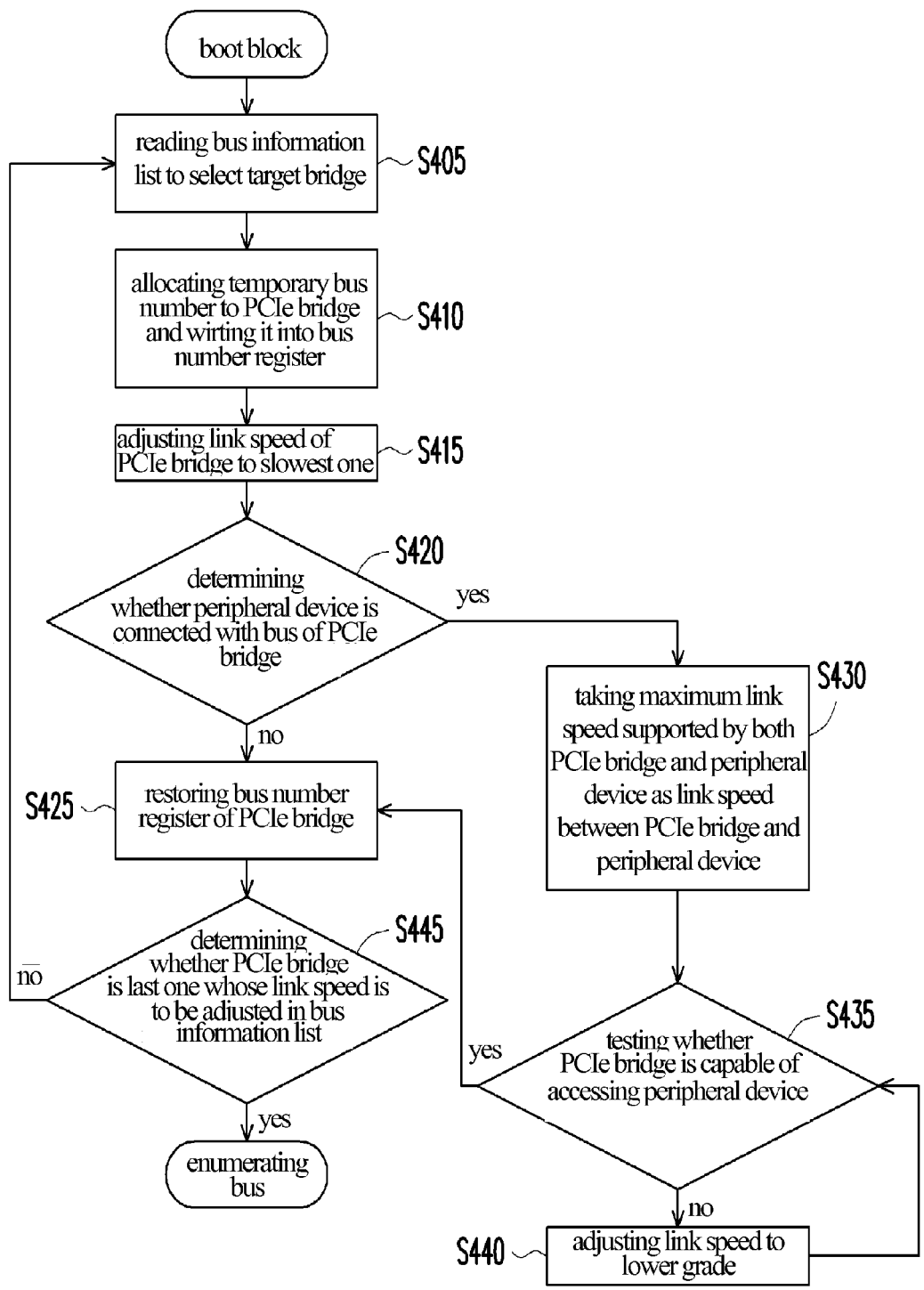
FIG. 4 is a flow chart showing a method for adjusting a link speed of a bridge according to another embodiment of the invention.

Hereinbelow another embodiment is provided to explain detailed steps of adjusting a link speed of a PCIe bridge. FIG. 4 is a flow chart showing a method for adjusting a link speed of a bridge according to another embodiment of the invention. Please refer to FIG. 4. In this embodiment, an algorithm is added into the BIOS to execute the following steps. In step S405, after the CPU executes the boot block code of the BIOS, a bus information list is read to select a PCIe bridge. For example, the bus information list (recording a device ID, a vendor ID, a bus number, a device number, and a function number of each PCIe bridge whose link speed is to be adjusted) can be created in advance according to circuits on a motherboard.

Then in step S410, a temporary bus number is allocated to the PCIe bridge whose link speed is to be adjusted, and it is written into a bus number register. That is, any bus number except 0 (0 is the number of the downstream bus immediately connected with a primary bridge) or other number having special uses can be used as the temporary bus number thus to be written into the register defined in the PCI/PCIe bridge specification. Thus when the bus is not enumerated yet, the peripheral device connected with the PCIe bridge (i.e. the PCIe device) can be accessed. In the embodiment, a temporary group of a subordinate bus number and a secondary bus number (such as Offset 1Ah and Offset 1Bh) can be written into respective registers.

In step S415, the link speed of the PCIe bridge is adjusted to the slowest one. For example, the link speed of the allocated temporary secondary bus of the PCIe bridge is first forcedly adjusted to the slowest one conforming to the PCIe 1.0, and then a PCI Express connection is re-established. Step S415 is to prevent the peripheral device connected with the bridge from failing to be accessed due to connection mechanism.

In step S420, whether a peripheral device is connected with the bus of the PCIe bridge is determined. For example, whether any PCIe device is connected with the bus with the allocated bus number can be determined using a memory mapped I/O (MMIO) or a conventional PCI configuration method. If the peripheral device is absent, step S425 is executed to restore the bus number register of the PCIe bridge.

On the other hand, if the peripheral device is present, step S430 is executed. A maximum link speed supported by both the PCIe bridge and the peripheral device is taken as the link speed between the target bridge and the peripheral device. For example, a maximum link speed supported by the peripheral device can be obtained from a PCI configuration register via software, and then the maximum link speed supported by both the PCIe bridge and the peripheral device is taken for the first test. After the maximum link speed is written into the corresponding register of the PCIe bridge, a connection is re-established.

After the PCIe bridge is connected with the peripheral device, step S435 is executed to test whether the PCIe bridge is capable of accessing the peripheral device. If the PCIe bridge fails to access the peripheral device, step S440 is executed to adjust the link speed to a lower grade. Then step S435 is re-executed until the PCIe bridge is capable of accessing the peripheral device.

When the PCIe bridge is capable of accessing the peripheral device, the current link speed is used as the link speed of the PCIe bridge, and then step S425 is executed to restore the bus number register of the PCIe bridge. Afterwards in step S445, whether the PCIe bridge is the last one whose link speed is to be adjusted in the bus information list is determined. If yes, all the adjustment of the PCIe bridges in the computer system has been completed. Then control of the computer system is returned to the BIOS to continue other procedures during POST such as the bus enumeration procedure. If not all of the PCIe bridges whose link speeds are to be adjusted have been adjusted yet, the method returns to step S405 to designate the next PCIe bridge whose link speed is to be adjusted, thus re-adjusting the link speed of another PCIe bridge.

The methods in the aforementioned embodiments can be used in a software layer or a firmware of the PCIe structure.

To sum up, in the aforementioned embodiments, an algorithm can be added in the firmware (such as the BIOS) or the software for initializing the computer system, thus adjusting the link speed of the bridge and improving compatibility between the peripheral device (such as an add on card) and the system (such as a server, a notebook computer, a desktop computer, a motherboard, or a barebone system). This method can benefit all the systems having extensible PCIe slots. Further, after the computer system is booted and before the bus enumeration procedure is executed, the link speed of the bridge can be adjusted. Accordingly, the late allocation of system resource when the computer is booted may not be affected and effect on the booting procedure may be reduced. Further, the connection between the bridge and the peripheral device can be established properly.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for adjusting a link speed, used after executing a boot block code and before executing a bus enumeration procedure, the method at least comprising the following steps of:

reading a bus information list to select a target bridge;
allocating a temporary bus number to the target bridge;
determining whether a bus of the target bridge is connected with the peripheral device according to the temporary bus number;
if the target bridge is connected with a peripheral device, taking a maximum link speed supported by both the target bridge and the peripheral device as the link speed between the target bridge and the peripheral device;
testing whether the target bridge is capable of accessing the peripheral device;
if the target bridge fails to access the peripheral device, adjusting the link speed down and re-establishing a connection between the target bridge and the peripheral device; and
re-executing the steps of testing whether the target bridge is capable of accessing the peripheral device and adjusting the link speed down if the target bridge fails to access the peripheral device until the target bridge is capable of accessing the peripheral device.

2. The method for adjusting a link speed according to claim 1, wherein the step of allocating the temporary bus number to the target bridge comprises the step of:
writing a temporary group of a subordinate bus number and a secondary bus number into respective registers.

3. The method for adjusting a link speed according to claim 2, wherein after the step of testing whether the target bridge is capable of accessing the peripheral device, the method further comprises the step of:
restoring the registers for storing the subordinate bus number and the secondary bus number if the target bridge is capable of accessing the peripheral device.

4. The method for adjusting a link speed according to claim 1, further comprising the steps of:
determining whether the target bridge is the last one whose link speed is to be adjusted in the bus information list; and
if the target bridge is not the last one whose link speed is to be adjusted in the bus information list, reading the bus information list to select another target bridge.

5. The method for adjusting a link speed according to claim 1, wherein after the step of allocating a temporary bus number to the target bridge, the method further comprises the steps of:
adjusting the link speed of the target bridge to a slowest speed.

6. A computer system comprising:
a central processing unit (CPU) executing a boot block code;
a control chip coupled to the CPU; and
a basic input/output system (BIOS) unit coupled to the control chip,
wherein after the CPU executes the boot block code and before the BIOS unit executes a bus enumeration procedure, the BIOS unit reads a bus information list to select a target bridge, allocates a temporary bus number to the target bridge, determines whether a bus of the target bridge is connected with the peripheral device according to the temporary bus number, takes a maximum link speed supported by both the target bridge and a peripheral device as the link speed between the target bridge and the peripheral device if the target bridge is connected with the peripheral device, and tests whether the target bridge is capable of accessing the peripheral device, and if the target bridge fails to access the peripheral device, the BIOS unit adjusts the link speed down, and after a connection between the target bridge and the peripheral device is re-established, the BIOS unit re-executes the steps of testing whether the target bridge is capable of accessing the peripheral device and adjusting the link speed down if the target bridge fails to access the peripheral device until the target bridge is capable of accessing the peripheral device.

7. The computer system according to claim 6, wherein the BIOS unit writes the temporary bus number into a bus number register.

8. The computer system according to claim 7, wherein if the BIOS unit determines that the target bridge is capable of accessing the peripheral device, the BIOS unit restores the bus number register.

9. The computer system according to claim 6, wherein the BIOS unit determines whether the target bridge is the last one whose link speed is to be adjusted in the bus information list, and if the target bridge is not the last one whose link speed is to be adjusted in the bus information list, the BIOS unit reads the bus information list to select another target bridge.

10. The computer system according to claim 6, wherein the link speed of the target bridge is adjusted to a slowest speed.

* * * * *